(12) United States Patent
Maeda et al.

(10) Patent No.: US 10,703,593 B2
(45) Date of Patent: Jul. 7, 2020

(54) SHEET HOUSING DEVICE AND IMAGE FORMING DEVICE INCLUDING SAME

(71) Applicant: KYOCERA Document Solutions Inc., Osaka (JP)

(72) Inventors: Hiroyuki Maeda, Osaka (JP); Yoshiaki Tashiro, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 16/269,738

(22) Filed: Feb. 7, 2019

(65) Prior Publication Data
US 2019/0248607 A1    Aug. 15, 2019

(30) Foreign Application Priority Data
Feb. 15, 2018   (JP) .................................. 2018-025046

(51) Int. Cl.
| | | |
|---|---|---|
| *B65H 1/04* | (2006.01) | |
| *B65H 1/26* | (2006.01) | |
| *B65H 7/02* | (2006.01) | |
| *H04N 1/00* | (2006.01) | |

(52) U.S. Cl.
CPC .............. *B65H 1/266* (2013.01); *B65H 1/04* (2013.01); *B65H 7/02* (2013.01); *H04N 1/00729* (2013.01); *B65H 2511/10* (2013.01)

(58) Field of Classification Search
CPC ...... B65H 1/04; B65H 1/266; B65H 2511/12; B65H 2511/10; B65H 2511/11; B65H 2553/612; B65H 2553/25
See application file for complete search history.

(56) References Cited

U.S. PATENT DOCUMENTS

| | | | | |
|---|---|---|---|---|
| 4,579,333 A | * | 4/1986 | Aoki ........................ | B65H 1/04 271/162 |
| 7,694,960 B2 | * | 4/2010 | Sing ....................... | B65H 1/266 271/171 |
| 8,360,419 B2 | * | 1/2013 | Hiura ..................... | B65H 1/266 271/171 |
| 9,527,684 B2 | * | 12/2016 | Nishioka ................ | B65H 1/266 |
| 10,093,496 B2 | * | 10/2018 | Hyodo ................... | B65H 1/266 |

FOREIGN PATENT DOCUMENTS

| | | | |
|---|---|---|---|
| JP | 2002321832 A | * | 11/2002 |
| JP | 2015105191 A | * | 6/2015 |
| JP | 2016-120994 | | 7/2016 |

* cited by examiner

*Primary Examiner* — Luis A Gonzalez
(74) *Attorney, Agent, or Firm* — Gerald E. Hespos; Michael J. Porco; Matthew T. Hespos

(57) ABSTRACT

A sheet housing device includes: a housing; and a sheet cassette. The sheet cassette has: a detection mechanism; and a pair of cursors. The detection mechanism includes: a detection switch; a first actuator; and a second actuator. A first cursor pushes down a pressed part of the first actuator and a connection part pushes up a connected part of the second actuator, and the second actuator swings in a first rotation direction from a first posture and the second actuator is set to a second posture in which a switch pressing part is capable of pressing a switch pressed part. The switch pressing part has: a first pressing part that is connected to a front end of a pressing arm; and a second pressing part that is disposed to protrude further toward an upstream side in the first rotation direction than the pressing arm does.

6 Claims, 16 Drawing Sheets

FIG.15
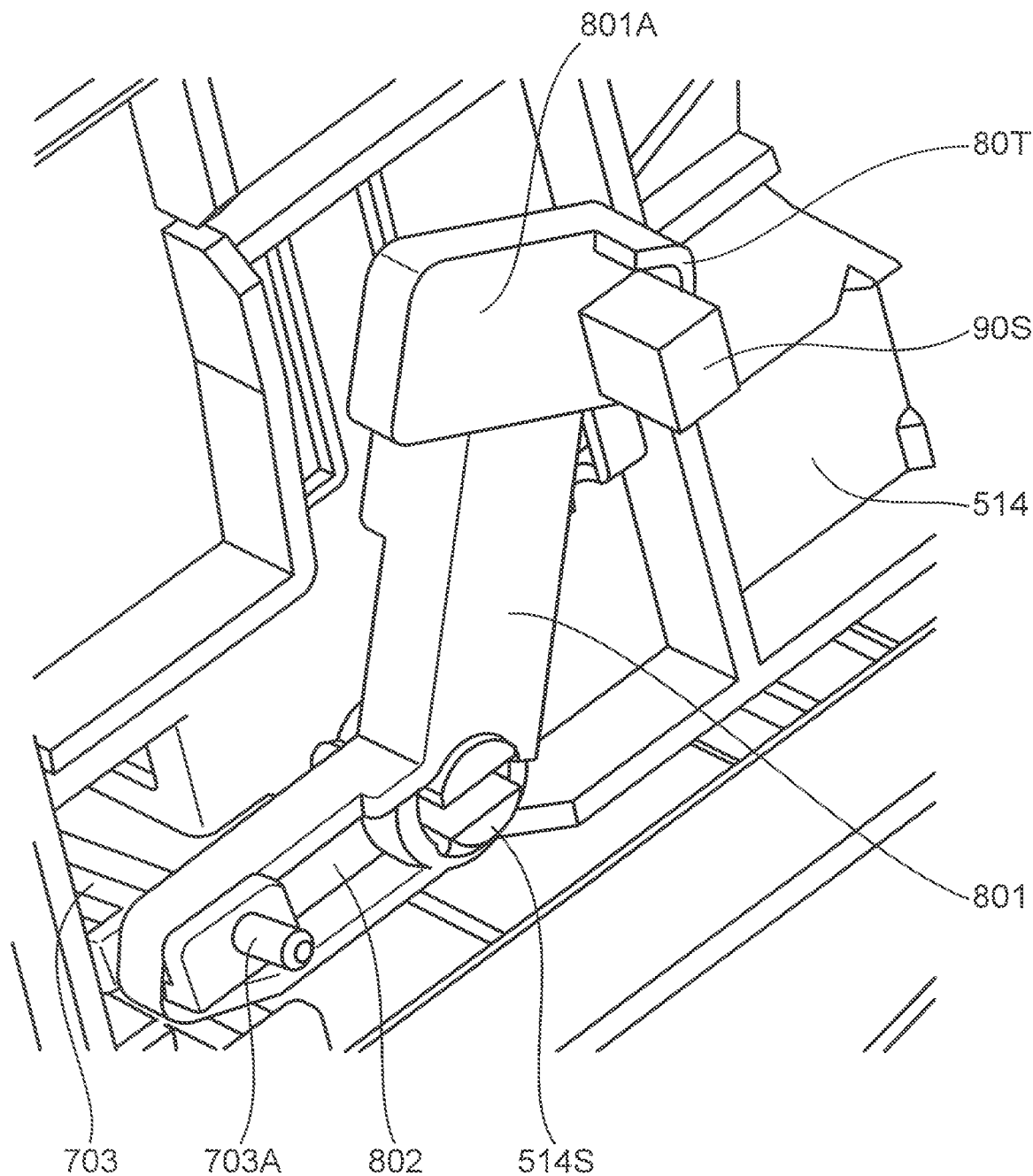
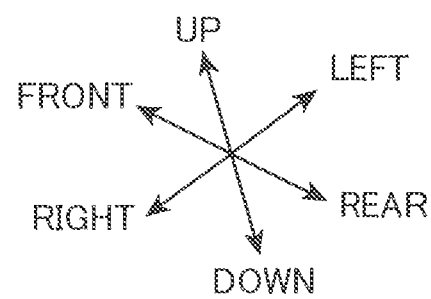

SHEET HOUSING DEVICE AND IMAGE FORMING DEVICE INCLUDING SAME

This application relates to and claims priority from Japanese Patent Application No. 2018-025046 filed in the Japan Patent Office on Feb. 15, 2018, the entire disclosure of which is incorporated herein by reference.

BACKGROUND

The present disclosure relates to a sheet housing device that houses sheets and is suitably applicable to an image forming device, such as a copier, a printer, or the like.

A sheet housing device that houses a plurality of sheets is suitably used in an image forming device, such as a copier, a printer, a facsimile device, or a multifunctional machine provided with the functions of these devices. In an image forming device, sheets that are stacked up are transported one by one from a sheet housing device, and an image is formed on the transported sheet inside a device main body of the image forming device.

Further, a technique is known in which a sheet housing device has a cassette structure (is a sheet cassette) that allows the sheet housing device to be pulled out from a device main body of an image forming device. The sheet cassette includes a pair of cursors that restrict positions of sheets in the width direction in order to allow the sheets to be transported in a stable manner. The pair of cursors are configured to be movable in the width direction of sheets in opposite directions from one another. Accordingly, width direction positions of sheets of a plurality of sizes can be restricted.

In this technique, a detection switch is fixed to the device main body of the image forming device in order to enable detection of the size of sheets housed in the sheet cassette. Further, one among the pair of cursors has a link mechanism connected thereto, and the link mechanism comes in contact with and separates from the detection switch depending upon the position of the cursor. Consequently, the detection switch outputs different voltages depending upon the position of the cursor, and the size of the sheets can be detected.

SUMMARY

A sheet housing device according to one aspect of the present disclosure includes: a housing that has an opposing wall; and a sheet cassette that is capable of housing sheets and that is attached to and detached from the housing along a first direction. The sheet cassette includes: a bottom wall on which the sheets are stacked; a wall part that is erected from the bottom wall and faces the opposing wall in a state in which the sheet cassette is attached to the housing; a pair of cursors that is slidable along the first direction on the bottom wall and restrict a position of the sheets, the pair of cursors including a first cursor that is arranged to face the wall part in the first direction and a second cursor that is arranged to face the first cursor at an opposite side from the wall part, the first cursor and the second cursor relatively moving in conjunction with each other in the opposite directions along the first direction; and a detection mechanism that detects a position of the first cursor. The detection mechanism includes: a detection switch arranged at the opposing wall; a first actuator that is supported by the bottom wall so as to be swingable with a first fulcrum part extending along a second direction perpendicular to the first direction as a fulcrum; and a second actuator that is supported by the wall part so as to be swingable with a second fulcrum part extending along the first direction as a fulcrum. The first actuator has: a pressed part that is provided at one end side of the first actuator in the first direction and is capable of emerging from and being retracted into the bottom wall; and a connection part that is provided at other end side of the first actuator in the first direction. The second actuator has: a support arm that extends in one direction from the second fulcrum part of the second actuator; a connected part that is arranged at an end part of the support arm and is connected to the connection part; a pressing arm that extends from the second fulcrum part of the second actuator in a direction differing from the direction in which the support arm extends; and a switch pressing part that is arranged at an end part of the pressing arm and is capable of pressing the detection switch. The detection switch has a switch pressed part that is arranged at the opposing wall so as to face the second actuator and is capable of being pressed by the switch pressing part. The first cursor is configured to be movable between a first position at which the first cursor is arranged at a predetermined distance from the second cursor in the first direction and a second position at which the first cursor is more distant from the second cursor toward the front end side in the first direction compared to when the first cursor is in the first position. When the first cursor is set to the first position, the pressed part of the first actuator protrudes upward from the bottom wall and the connection part pushes down the connected part of the second actuator, and the second actuator is set to a first posture in which the switch pressing part is spaced away from the switch pressed part, and when the first cursor is set to the second position, the first cursor pushes down the pressed part of the first actuator and the connection part pushes up the connected part of the second actuator, and the second actuator swings in a first rotation direction from the first posture with the second fulcrum part as the fulcrum and the second actuator is set to a second posture in which the switch pressing part is capable of pressing the switch pressed part. The switch pressing part has: a first pressing part that is connected to a front end of the pressing arm; and a second pressing part that protrudes from the first pressing part further toward an upstream side in the first rotation direction than the pressing arm does.

BRIEF DESCRIPTION OF THE DRAWINGS

FIG. 15 is a perspective view in which a part of a sheet housing device according to another modified embodiment of the present disclosure is enlarged.

DETAILED DESCRIPTION

In the following, an embodiment of the present disclosure will be described with reference to the drawings. Note that in the following description, "sheets" refer to pieces of copy paper, pieces of coated paper, transparencies, pieces of cardboard, postcards, pieces of tracing paper, and other types of sheet material that are subjected to image forming processing.

Figure 1:
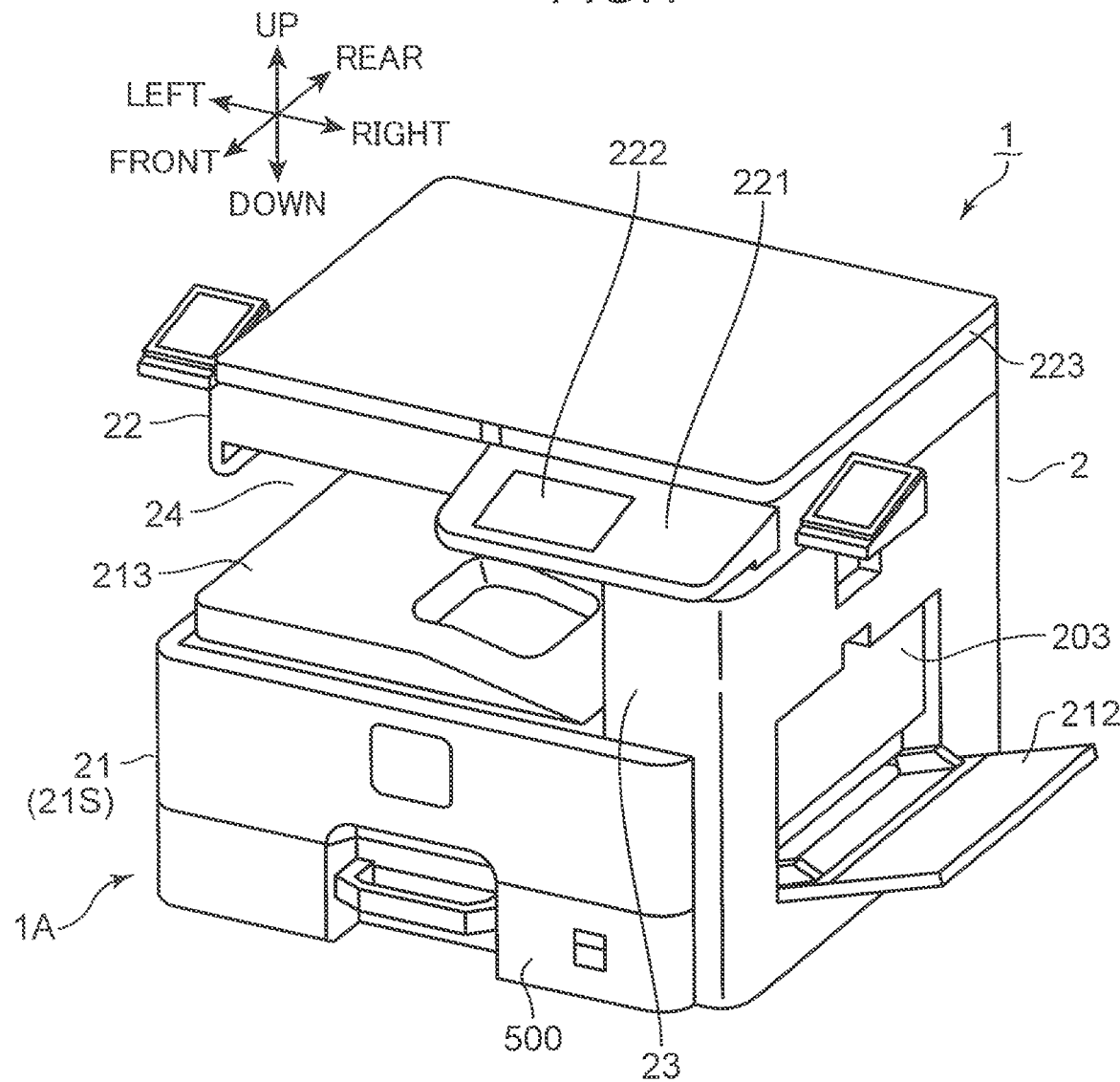
FIG. 1 is a perspective view of an image forming device according to an embodiment of the present disclosure.
Figure 2:
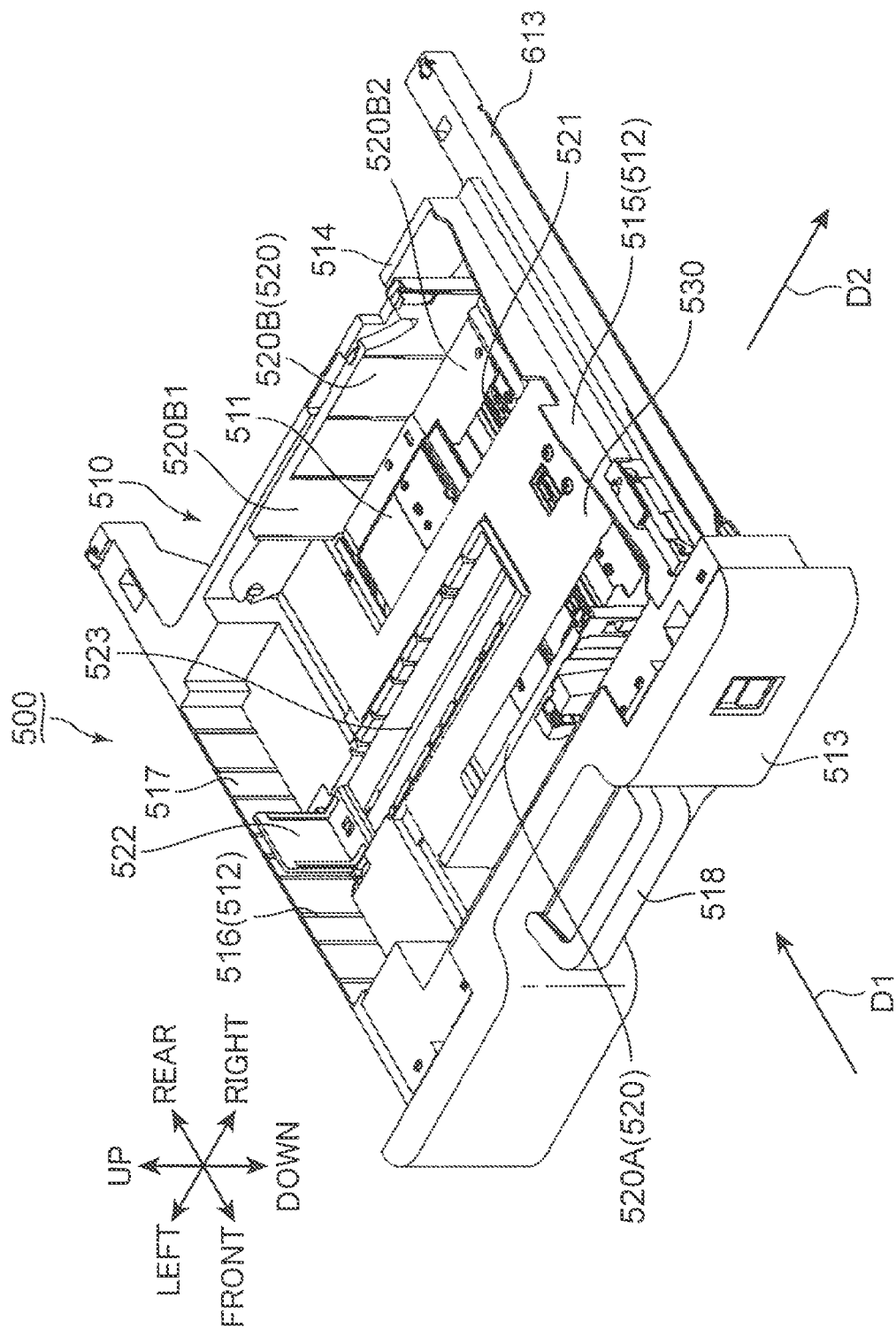
FIG. 2 is a perspective view of a sheet cassette according to the embodiment of the present disclosure.

FIG. 1 is a perspective view of an image forming device according to the embodiment of the present disclosure. The image forming device illustrated in FIG. 1 is a so-called in-body discharge type copier. In other embodiments, however, the image forming device may be a printer, a facsimile device, a multifunctional machine having the functions of these devices, or another device for forming toner images on sheets. Further, FIG. 2 is a perspective view of a sheet cassette 500. The sheet cassette 500 is attachable to and detachable from a lower housing 21.

An image forming device 1 includes a main housing 2 having a substantially rectangular parallelepiped shape. The main housing 2 includes: the lower housing 21, which has a substantially rectangular parallelepiped shape; an upper housing 22 that has a substantially rectangular parallelepiped shape and is disposed above the lower housing 21; and a joint housing 23 that joins the lower housing 21 and the upper housing 22. The joint housing 23 extends along the right and rear edges of the main housing 2. Sheets to which print processing has been applied are discharged to a discharge space 24 that is surrounded by the lower housing 21, the upper housing 22, and the joint housing 23.

An operation unit 221 protrudes toward the front direction of the upper housing 22. The operation unit 221 includes, for example, an LCD touch panel 222. The operation unit 221 is formed to enable input of information relating to image forming processing. For example, a user can input the number of sheets to be printed, or the like, and input printing density, or the like, via the LCD touch panel 222. The upper housing 22 mainly houses therein a device for reading document images and electronic circuits in charge of controlling the entire image forming device 1.

The upper housing 22 has disposed thereon a holding cover 223 used for holding down documents. The holding cover 223 is attached to the upper housing 22 so as to be rotatable up and down. The user makes the holding cover 223 rotate upward and places a document on the upper housing 22. Then, the user can operate the operation unit 221 to cause a device disposed inside the upper housing 22 to read the image on the document.

The sheet cassette 500, which is capable of housing a plurality of sheets, is disposed in the lower housing 21 (a housing). The sheet cassette 500 is attached with respect to the lower housing 21 along a horizontal first direction (the direction of arrow D1 in FIG. 2) and is pulled out from the lower housing 21 along a direction (a reverse first direction) opposite the first direction. The sheets housed inside the sheet cassette 500 are sent out in the lower housing 21 in a second direction (the direction of arrow D2 in FIG. 2) that is perpendicular to both the first direction and the up-down direction. Inside the lower housing 21, image forming processing is applied to the sheets based on instructions input by the user via the operation unit 221, and the sheets are discharged into the discharge space 24. Note that the lower housing 21 and the sheet cassette 500 constitute a sheet housing device 1A (FIG. 1) of the present disclosure.

The lower housing 21 has a tray 212 attached thereto in rotatable state to the right surface thereof. When the tray 212 is positioned to protrude toward the right of the lower housing 21 as illustrated in FIG. 1, the user can place sheets on the tray 212. Based on instructions input by the user via the operation unit 221, image forming processing is applied to the sheets on the tray 212 after the sheets are drawn into the lower housing 21, and the sheets are discharged into the discharge space 24. When the tray 212 is rotated upward, the tray 212 is housed inside a housing space 203 that is recessed in the right surface of the lower housing 21, whereby a supply port for drawing sheets into the lower housing 21 is closed.

The lower housing 21 houses various devices for forming images on sheets. Further, the joint housing 23 houses various devices for discharging, into the discharge space 24, sheets to which image forming processing has been applied. In the present embodiment, an image forming unit 21S (FIG. 1) in which a known electrophotographic technique is used is arranged inside the lower housing 21. Note that the image forming method of the image forming unit 21S is not limited to an electrophotographic technique, and a known ink jet method or the like may be used.

<Structure of Sheet Cassette>

The sheet cassette 500 includes a housing 510 that is formed to be capable of housing sheets. The housing 510 includes a bottom wall 511 having a substantially rectangular shape, and a pair of lateral walls 512, a front wall 513, and a rear wall 514. The lateral walls 512, the front wall 513, and the rear wall 514 are erected upward from peripheral edges of the bottom wall 511. The bottom wall 511 allows sheets to be stacked thereon. The front wall 513 extends between front side edge parts of the pair of lateral walls 512 and appears at the outer surface of the main housing 2 when the housing 510 is completely housed inside the lower housing 21. The rear wall 514 (a wall part) is disposed to face the front wall 513, and is erected so as to extend in the up-down direction and the left-right direction (the second direction) from a front end side (rear side) of the bottom wall 511 in the first direction. The rear wall 514 is arranged such that, in a state in which the sheet cassette 500 is attached to the lower housing 21, the rear wall 514 faces an inner wall 21T (see FIG. 14) (an opposing wall) arranged in the lower housing 21. Among the pair of lateral walls 512, the lateral wall positioned to the right is a downstream wall 515 that is positioned downstream in the sheet transport direction and the lateral wall positioned to the left is an upstream wall 516 that is positioned upstream in the sheet transport direction. Each of the pair of lateral walls 512 meshes with a rail 613, whereby the movement of the sheet cassette 500 in the first direction and the reverse first direction is guided. The front wall 513 has a substantially U-shaped grip part 518. The user is capable of gripping the grip part 518 and thereby moving the sheet cassette 500 in the first direction and in the reverse first direction. The upper edges of the pair of lateral walls 512, the upper edge of the front wall 513, and the upper edge of the rear wall 514 form an opening 517 for housing sheets in the sheet cassette 500. The user can house sheets in the housing 510 through the opening 517.

The sheet cassette 500 further includes: a lift plate 530 laid on the bottom wall 511; and a pair of side cursors 520 (a pair of cursors) that are each adjacent to one of the front wall 513 and the rear wall 514. Along with the bottom wall 511, the lift plate 530 allows sheets to be stacked thereon. Further, in FIG. 2, the sheet transport direction downstream side (downstream wall 515 side) of the lift plate 530 can be lifted upward in a state in which sheets are stacked on the upper surface of the lift plate 530, whereby the lift plate 530 can adopt an posture for sending out the sheets stacked thereon to a sheet transport path (not illustrated) inside the lower housing 21.

The pair of side cursors 520 extend in the up-down direction and the left-right direction on top of the bottom wall 511, and are configured to be slidable along the front-rear direction. The pair of side cursors 520 restrict the position (positional deviation) of sheets in the width direction (the first direction). Each of the pair of side cursors 520 is provided with a rack gear. These rack gears engage with a pinion gear arranged in the bottom wall 511. Consequently, when one of the side cursors 520 forming a pair is moved in the front-rear direction, the other one of the side cursors 520 moves in interlocked state. Further, in the bottom wall 511, a guide groove 521 for guiding the movement of the pair of side cursors 520 is formed. The guide groove 521 extends from the front wall 513 toward the rear wall 514. The pair of side cursors 520 are movable in opposite directions from one another along the width direction of sheets. Thus, the user can place the pair of side cursors 520 into contact with lateral edges of sheets of any size. Note that the pair of side cursors 520 include: a front cursor 520A (first cursor) arranged at the front side (the rear end side in the first direction); and a rear cursor 520B (second cursor) arranged at the rear side (the front end side in the first direction; the rear wall 514 side (FIG. 2)). The front cursor 520A is arranged to face the rear cursor 520B at the opposite side from the rear wall 514. The front cursor 520A and the rear cursor 520B relatively move in conjunction with each other in the opposite directions along the first direction.

Further, the sheet cassette 500 has a rear end cursor 522. The rear end cursor 522 restricts the rear end position (the position of the upstream side of the sheet transport direction) of sheets housed in the sheet cassette 500. The rear end cursor 522 is movable to the left and to the right along a guide groove 523 formed in the bottom wall 511.

Figure 3:
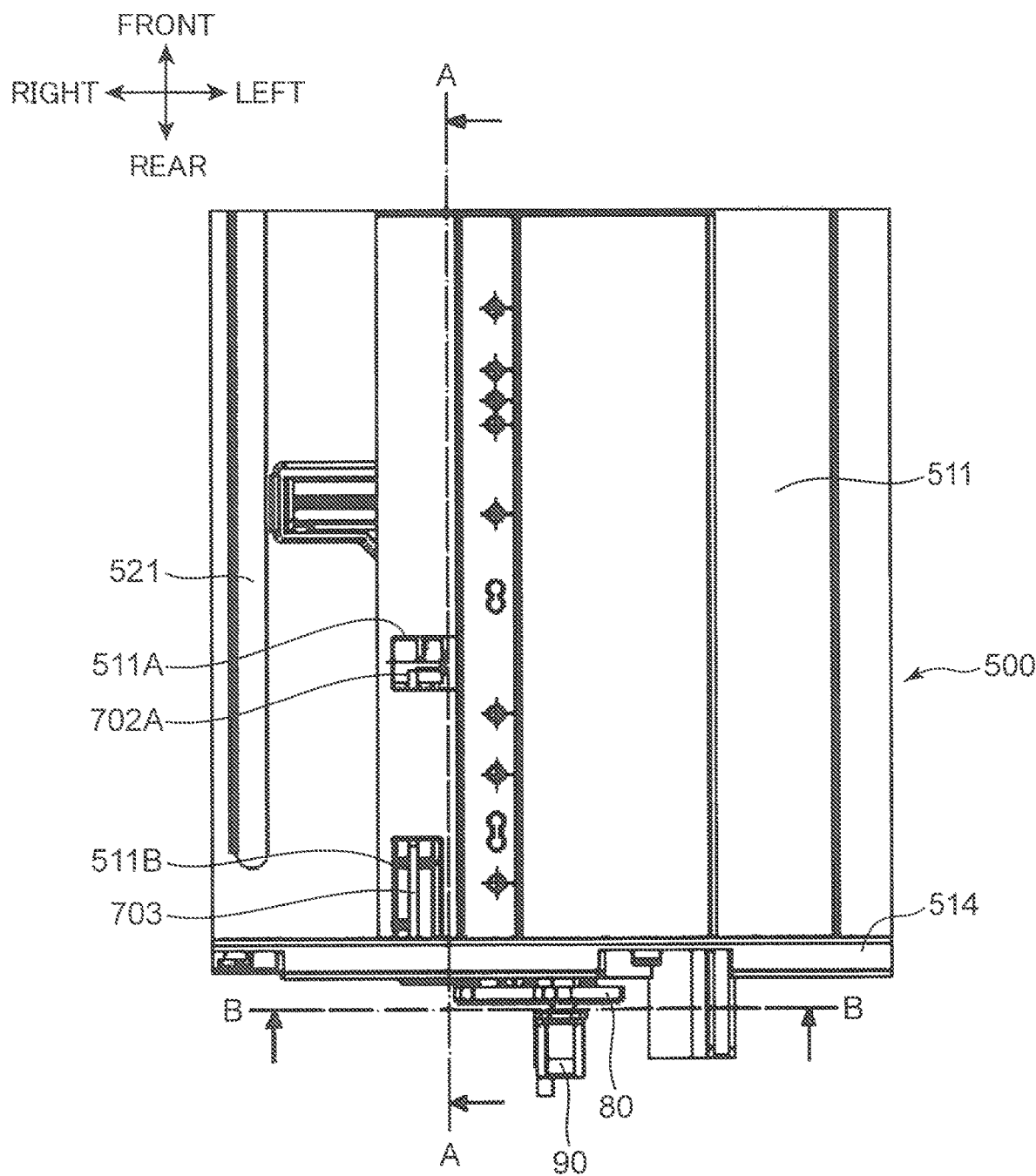
FIG. 3 is a plan view in which a part of the sheet cassette according to the embodiment of the present disclosure is enlarged.
Figure 4:
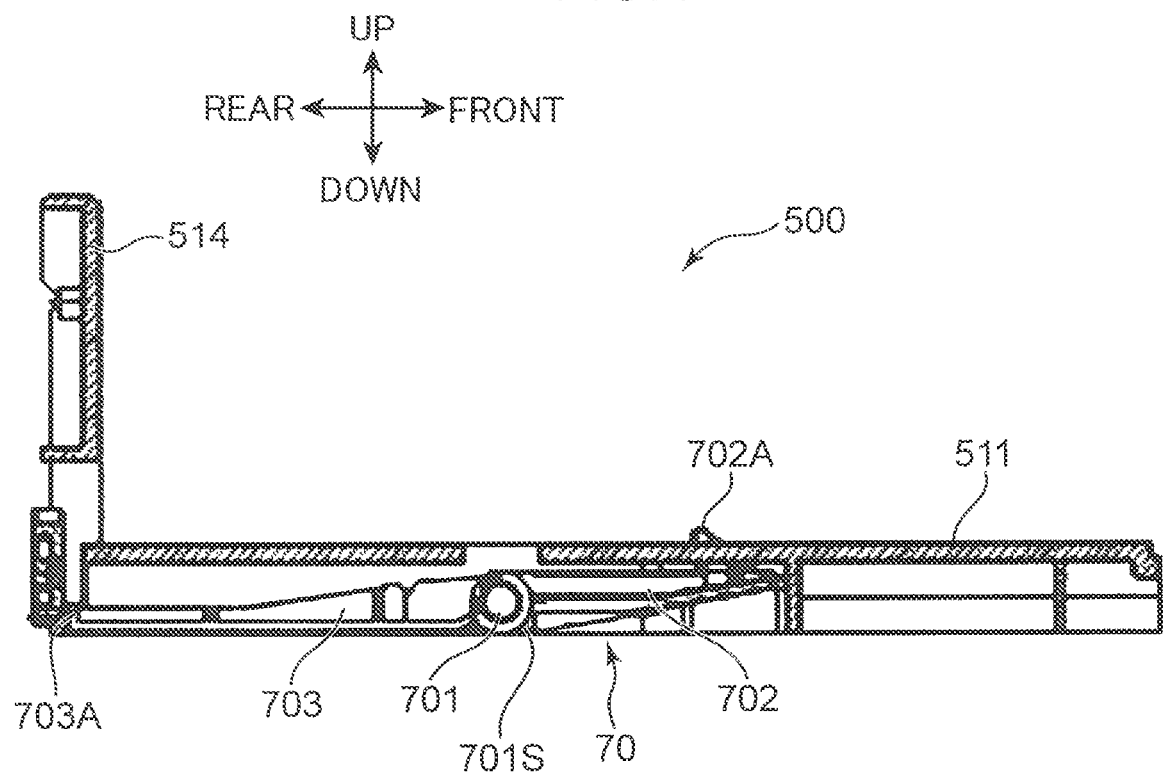
FIG. 4 is a lateral cross-sectional view at position A-A of the sheet cassette illustrated in FIG. 3.
Figure 5:
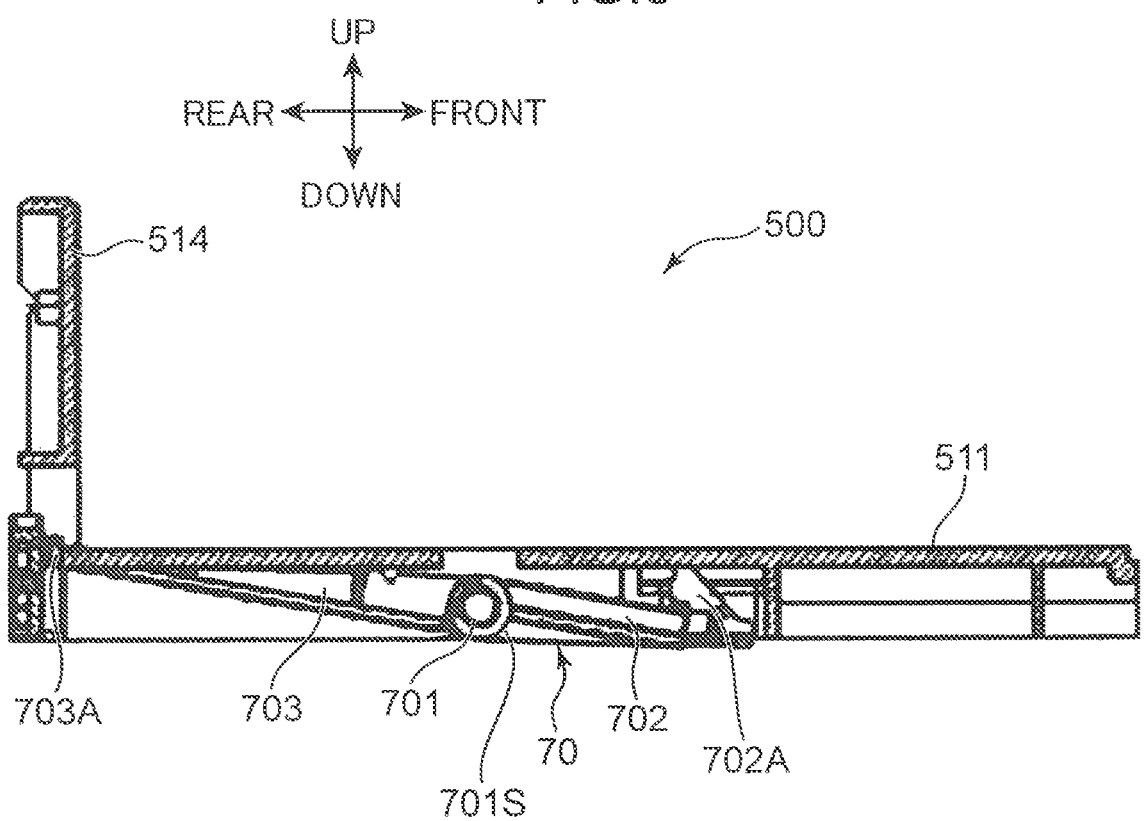
FIG. 5 is a lateral cross-sectional view at position A-A of the sheet cassette illustrated in FIG. 3.
Figure 6:
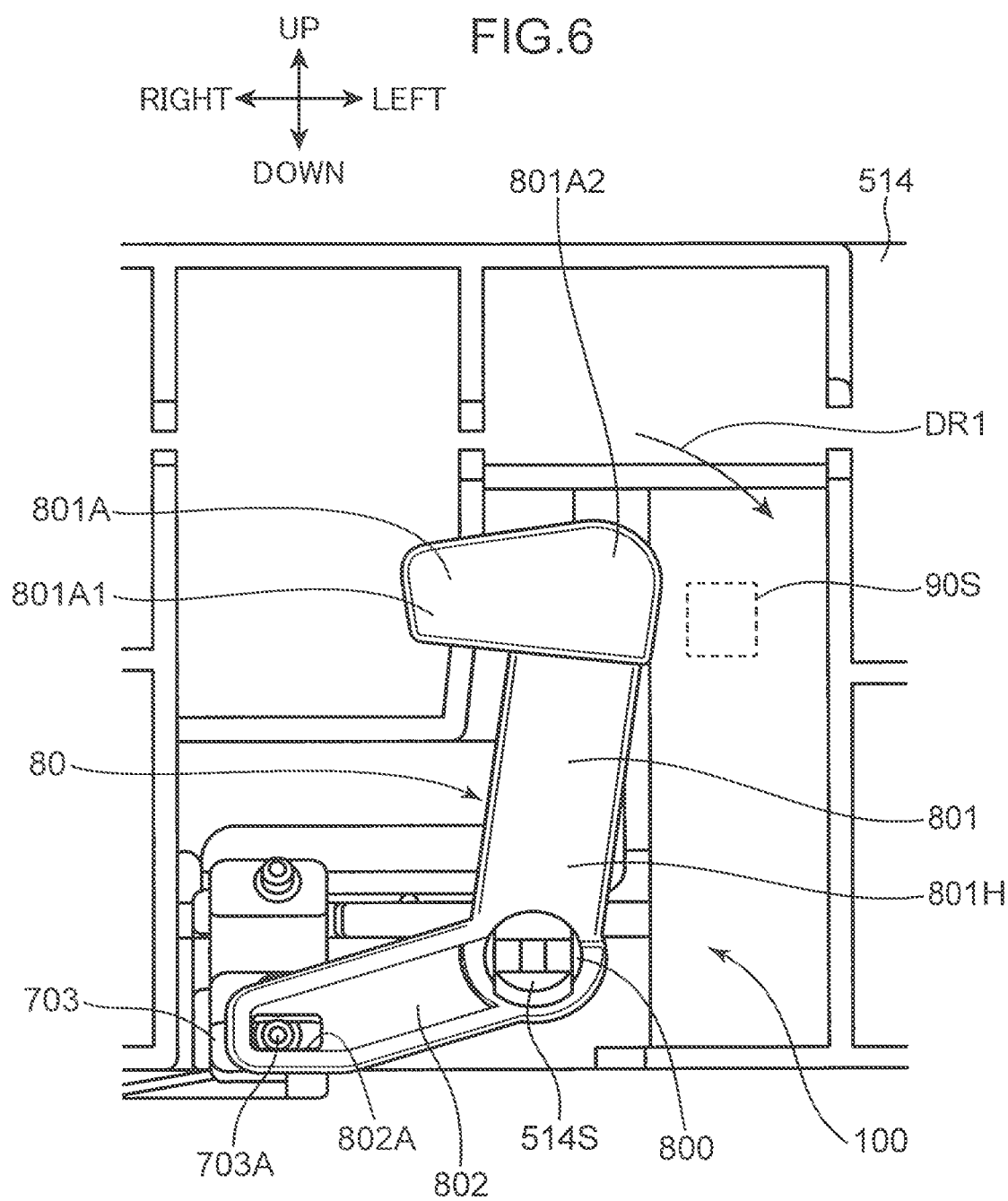
FIG. 6 is a rear view in which the sheet cassette according to the embodiment of the present disclosure is enlarged, and illustrates a front shape of a pressing member in a first posture.
Figure 7:
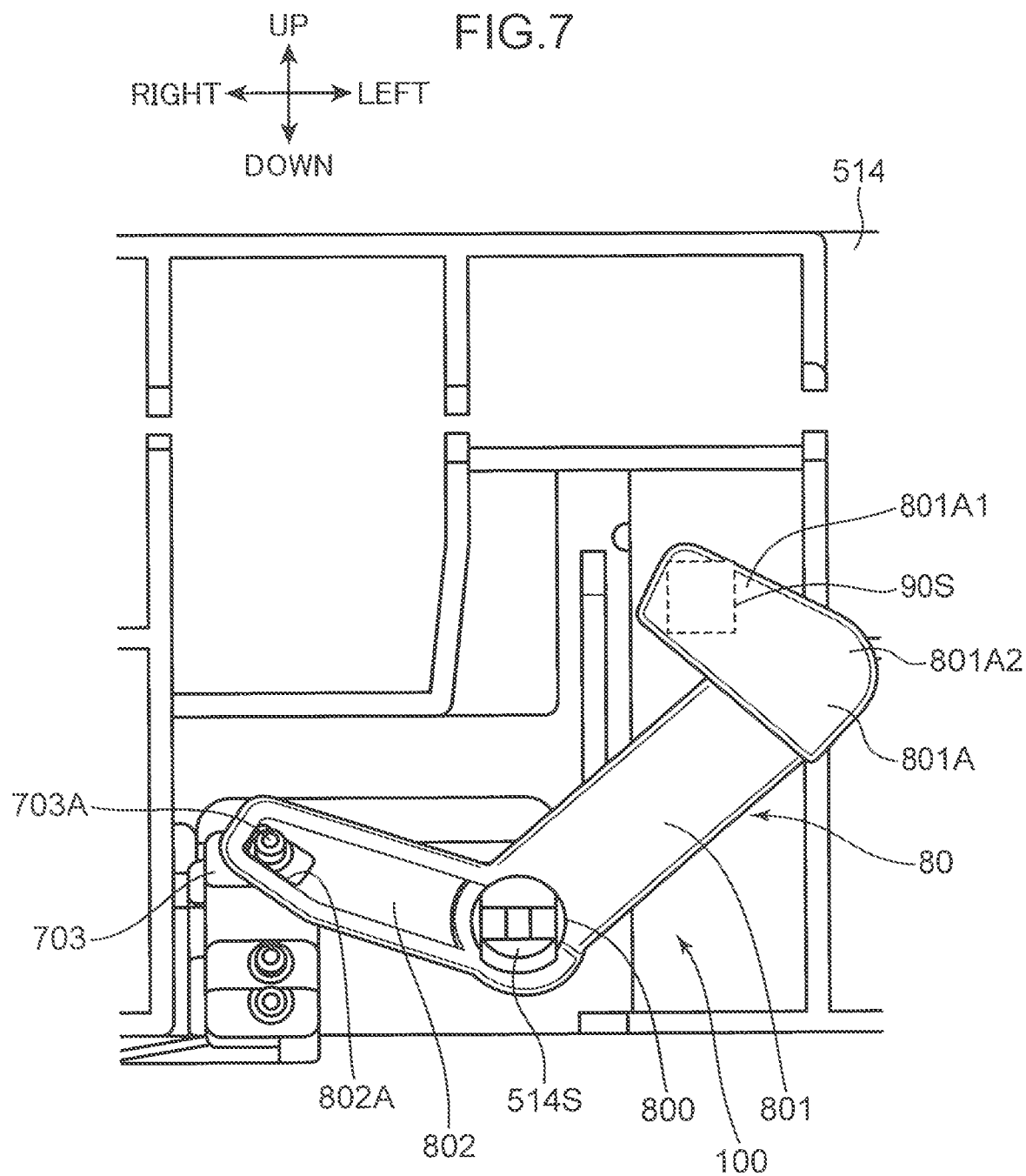
FIG. 7 is a diagram illustrating a state in which the pressing member has rotated from the first posture in FIG. 6 to a second posture.
Figure 8:
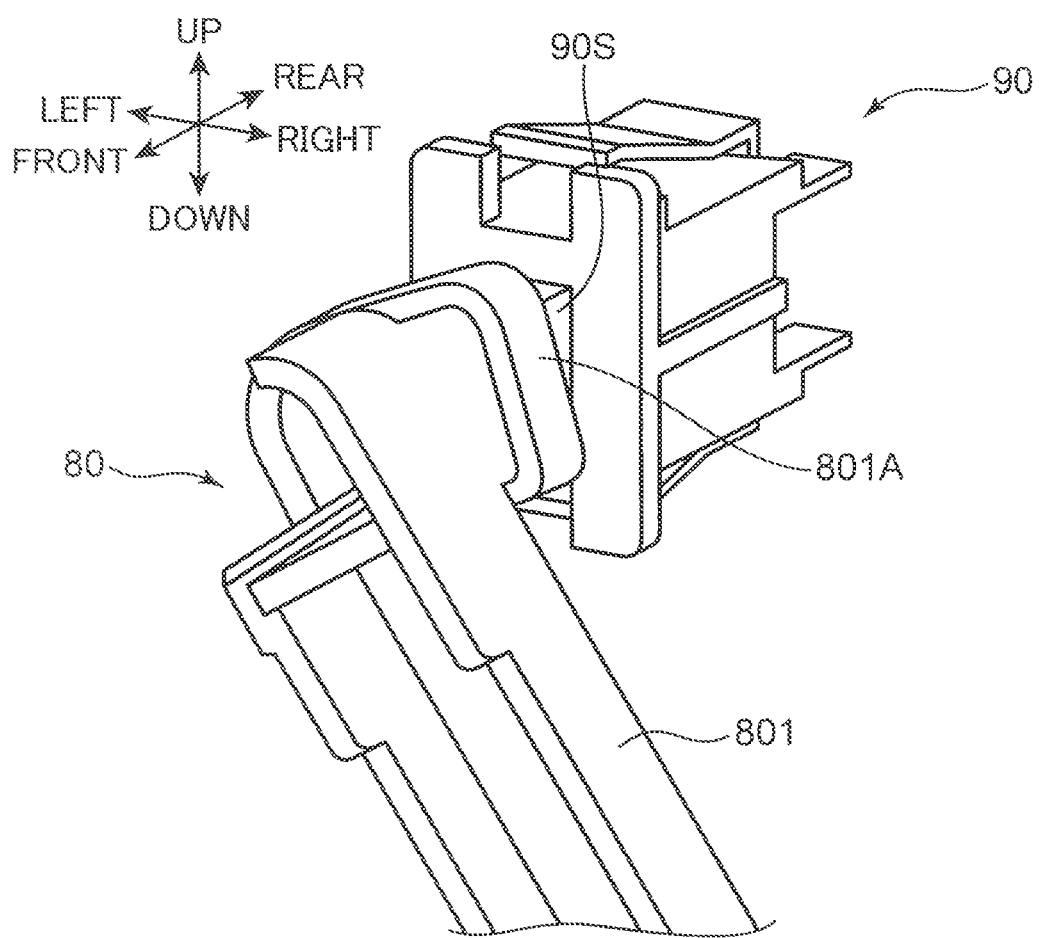
FIG. 8 is a perspective view of the pressing member and a detection switch according to the embodiment of the present disclosure.
Figure 9:
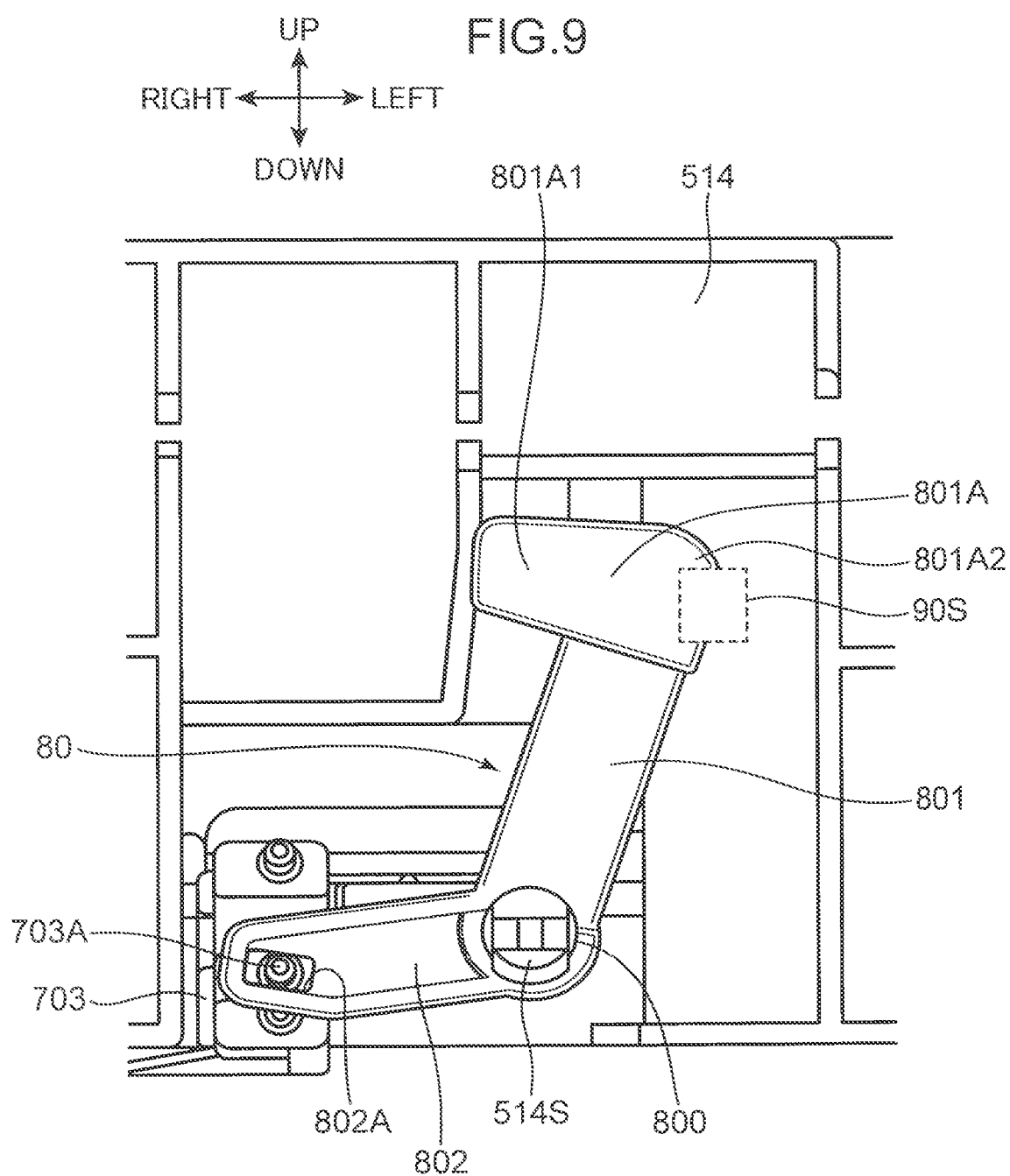
FIG. 9 is a diagram illustrating a state in which the pressing member has rotated from the second posture in FIG. 7 to a third posture.

Further, the sheet cassette 500 includes: a link lever 70 (a first actuator); and a pressing lever 80 (a second actuator). FIG. 3 is a plan view in which a part of the sheet cassette 500 according to the present embodiment is enlarged. FIGS. 4 and 5 are lateral cross-sectional views at position A-A of the sheet cassette 500 illustrated in FIG. 3. FIG. 6 is a rear view in which the sheet cassette 500 according to the present embodiment is enlarged, and illustrates the front shape of the pressing lever 80 in a first posture. FIG. 7 is a diagram illustrating a state in which the pressing lever 80 has rotated from the first posture in FIG. 6 to a second posture. FIG. 8 is a perspective view of the pressing lever 80 and a push switch 90 according to the present embodiment. FIG. 9 is a diagram illustrating a state in which the pressing lever 80 has rotated from the second posture in FIG. 7 to a third posture.

The link lever 70 (FIGS. 4 and 5) is supported by the bottom wall 511 so as to be swingable with a first fulcrum part 701 that extends along the left-right direction (the second direction) as a fulcrum. The link lever 70 includes: the first fulcrum part 701; a spring 701S; a first arm 702; and a second arm 703.

The first fulcrum part 701 is supported by the bottom wall 511. The spring 701S is a spring member externally fitted onto the first fulcrum part 701, and biases the link lever 70 such that the link lever 70 adopts the posture illustrated in FIG. 4.

The first arm 702 is arranged to extend toward the front (the rear end side in the first direction) from the first fulcrum part 701. The first arm 702 includes a pressed part 702A. The pressed part 702A is arranged at the front end part of the first arm 702 (the rear end side of the link lever 70 in the first direction), and has a substantially triangular shape in lateral view. The pressed part 702A is configured to be capable of emerging upward from and being retracted into the bottom wall 511.

The second arm 703 is arranged to extend toward the rear (the front end side in the first direction) from the first fulcrum part 701. The second arm 703 includes an engagement pin 703A (a connection part). The engagement pin 703A is arranged at the front end part of the second arm 703 (the front end side of the link lever 70 in the first direction), and has a columnar shape that extends toward the rear. Referring to FIG. 3, the pressed part 702A and the second arm 703 of the link lever 70 are respectively exposed at the top of the sheet cassette 500 through a first opening 511A and a second opening 511B that are opened in the bottom wall 511.

The pressing lever 80 (FIG. 6) is supported by the rear surface part of the rear wall 514 so as to be swingable with a second fulcrum part 800 that extends along the front-rear direction (the first direction) as a fulcrum. The postures of the pressing lever 80 illustrated in FIGS. 6, 7, and 9 are respectively defined as a first posture, a second posture, and a third posture. The pressing lever 80 includes: the second fulcrum part 800; a third arm 801 (a pressing arm); and a fourth arm 802 (a support arm).

The second fulcrum part 800 is supported by the rear wall 514. The second fulcrum part 800 is a hole part that is opened in the substantially central part of the pressing lever 80, and a shaft part 514S protruded from the rear wall 514 is inserted through the second fulcrum part 800. Consequently, the pressing lever 80 rotates (swings) about the shaft part 514S (the second fulcrum part 800).

The third arm 801 is arranged to extend from the second fulcrum part 800 in a predetermined direction (upward in FIG. 6) along the rear wall 514. In other words, the third arm 801 is arranged at a position corresponding to the front end part of the pressing lever 80. The third arm 801 includes: an arm main body 801H that extends from the second fulcrum part 800; and a switch pressing part 801A arranged at the front end part of the arm main body 801H. The switch pressing part 801A includes a rear surface part formed by a flat surface that is parallel with the left-right direction, and the rear surface part is configured to be capable of pressing a switch pressed part 90S of the later-described push switch 90.

The fourth arm 802 is arranged to extend from the second fulcrum part 800 in a direction different from the third arm 801 (the lower right direction in FIG. 6) along the rear wall 514. The fourth arm 802 includes an engagement hole 802A (a connected part) arranged at a position corresponding to the base end part of the pressing lever 80. The engagement hole 802A is a rectangular opening that is opened in the front end part of the fourth arm 802. The engagement pin 703A of the link lever 70 is inserted into the engagement hole 802A, whereby the engagement pin 703A and the engagement hole 802A engage with one another and are made capable of moving integrally. In each of FIGS. 6, 7, and 9, the engagement pin 703A (the second arm 703) in the first posture, the engagement pin 703A in the second posture, and the engagement pin 703A in the third posture are illustrated adjacently.

Further, the lower housing 21 includes the push switch 90 (a detection switch). The push switch 90 is arranged at an inner wall (an opposing wall) of the lower housing 21 so as to face the pressing lever 80. In other words, the push switch 90 is arranged so as to face the space in the lower housing 21 where the sheet cassette 500 is attached. The push switch 90 includes the switch pressed part 90S. The switch pressed part 90S is capable of being pressed by the switch pressing part 801A of the pressing lever 80. Note that the switch pressed part 90S has a prismatic shape protruded toward the front from the main body part of the push switch 90. The switch pressed part 90S is biased toward the front by an unillustrated biasing member. Here, a switch off signal (0V voltage) is output from the push switch 90 to an unillustrated control unit of the image forming device 1. Meanwhile, when the switch pressed part 90S is pressed toward the rear against the biasing force of the above-described biasing member, a switch on signal (5V voltage) is output from the push switch 90 to the unillustrated control unit of the image forming device 1. The push switch 90, the pressing lever 80, and the link lever 70 constitute a detection mechanism 100 (FIG. 6) of the present disclosure. The detection mechanism 100 detects the position of the rear cursor 520B.

Referring to FIG. 2, the rear cursor 520B includes: a vertical part 520B1; and a horizontal part 520B2. The vertical part 520B1 extends vertically upward from the bottom wall 511, and contacts the lateral edges of the sheets housed in the sheet cassette 500. Meanwhile, the horizontal part 520B2 is connected to the lower end part of the vertical part 520B1 and extends horizontally so as to overlap with the bottom wall 511. The vertical part 520B1 supports the lower surface of the lowermost sheet among the plurality of sheets stacked on the bottom wall 511 (the lift plate 530). To describe the shape of the rear cursor 520B in another way, the rear cursor 520B has a substantially L shape in lateral view when viewed from the left. The same applies to the shape and structure of the front cursor 520A. Here, the horizontal part of the front cursor 520A extends in a direction opposite the direction in which the horizontal part of the rear cursor 520B extends (the front cursor 520A has a reverse L shape).

As described above, the front cursor 520A and the rear cursor 520B move in opposite directions from one another in the front-rear direction. As a result, the width direction position of sheets can be restricted in both a case in which small-sized sheets such as postcards are housed in the sheet cassette 500 and a case in which large-sized sheets such as A4 horizontal size sheets are housed in the sheet cassette 500.

That is, the rear cursor 520B among the side cursors 520 is configured to be movable between a first position in which the rear cursor 520B is arranged at a predetermined distance from the front cursor 520A in the front-rear direction (the first direction) and a second position in which the rear cursor 520B is more distant from the front cursor 520A toward the rear (the front end side in the first direction) compared to a case where the rear cursor 520B is in the first position. For example, the first position corresponds to the small-sized sheets described above and the second position corresponds to the large-sized sheets described above.

When the rear cursor 520B is set to the first position, the horizontal part 520B2 of the rear cursor 520B is arranged to be spaced away from the pressed part 702A toward the front. Accordingly, due to the biasing force of the spring 701S, the pressed part 702A of the link lever 70 protrudes upward from the bottom wall 511 and the engagement pin 703A is arranged at a position lower than the pressed part 702A is, as illustrated in FIG. 4. In other words, the link lever 70 is set to an posture in which the link lever 70 is tipped up forward. In this state, since the engagement pin 703A is inserted into the engagement hole 802A of the pressing lever 80, the engagement pin 703A pushes down the fourth arm 802 (the engagement hole 802A). Thus, the pressing lever 80 is set to the first posture illustrated in FIG. 6. That is, as illustrated in FIG. 6, the switch pressing part 801A of the pressing lever 80 is arranged at a position spaced away from the switch pressed part 90S along the left-right direction (to the right).

The sheet cassette 500 is pulled out toward the front from the lower housing 21, and small-sized sheets are housed in the sheet cassette 500 in a state in which the front cursor 520A and the rear cursor 520B are arranged at the first position. Then, the sheet cassette 500 is attached inside the lower housing 21 once again in the state in which the pressing lever 80 is arranged in the first posture, as described above. In this state, since the switch pressing part 801A is spaced away from the switch pressed part 90S, the switch pressing part 801A does not press the switch pressed part 90S. Accordingly, the push switch 90 outputs the switch off signal (0V voltage) to the unillustrated control unit of the image forming device 1, whereby the control unit detects that small-sized sheets are housed in the sheet cassette 500.

Figure 12:
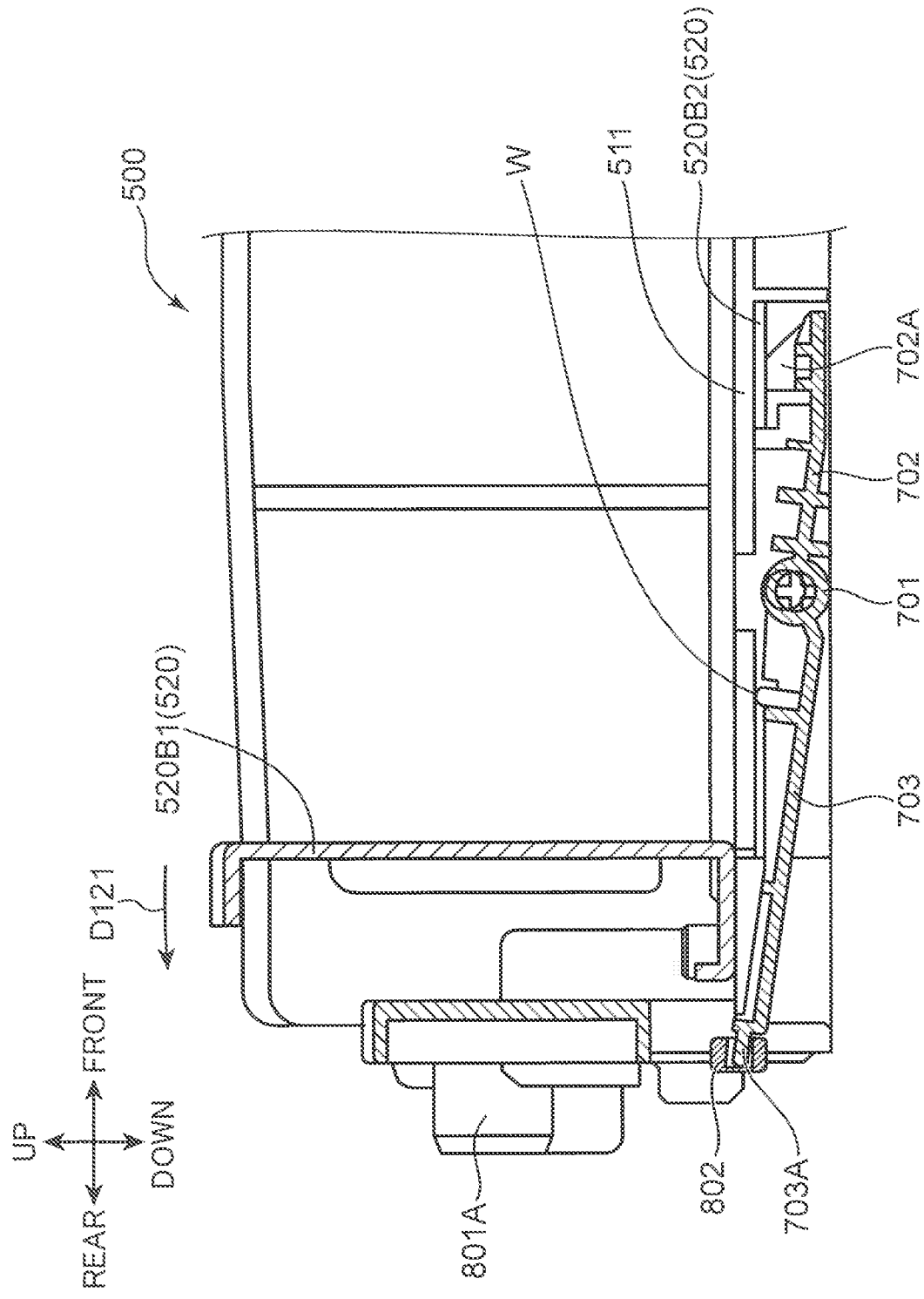
FIG. 12 is a cross-sectional view in which a part of FIG. 5 is enlarged.

Meanwhile, when the rear cursor 520B is set to the second position, the rear cursor 520B is arranged at the position illustrated in FIGS. 5 and 12. In this case, the horizontal part 520B2 of the rear cursor 520B is positioned immediately above the pressed part 702A of the link lever 70 and pushes down the pressed part 702A of the link lever 70 against the biasing force of the spring 701S. Accordingly, the pressed part 702A is positioned lower than the upper surface part of the bottom wall 511 is, and the engagement pin 703A is arranged at a higher position than the pressed part 702A is. In other words, the link lever 70 is set to an posture in which the link lever 70 is tipped up rearward. Further, the engagement pin 703A of the second arm 703 pushes up the engagement hole 802A of the pressing lever 80, whereby the pressing lever 80 swings in a first rotation direction (arrow DR1 in FIG. 6) from the first posture of FIG. 6 with the second fulcrum part 800 as the fulcrum. Consequently, the pressing lever 80 is set to the second posture illustrated in FIG. 7, and the switch pressing part 801A is made capable of pressing the switch pressed part 90S along the front-rear direction.

That is, the sheet cassette 500 is pulled out toward the front from the lower housing 21, and large-sized sheets are housed in the sheet cassette 500 in a state in which the front cursor 520A and the rear cursor 520B are arranged at the second position. Then, the sheet cassette 500 is attached inside the lower housing 21 once again in the state in which the pressing lever 80 is arranged in the second posture, as described above. In this state, since the switch pressing part 801A is arranged facing the switch pressed part 90S, the switch pressing part 801A presses the switch pressed part 90S toward the rear. Accordingly, the push switch 90 outputs the switch on signal (5V voltage) to the unillustrated control unit of the image forming device 1, whereby the control unit detects that large-sized sheets are housed in the sheet cassette 500.

Figure 16:
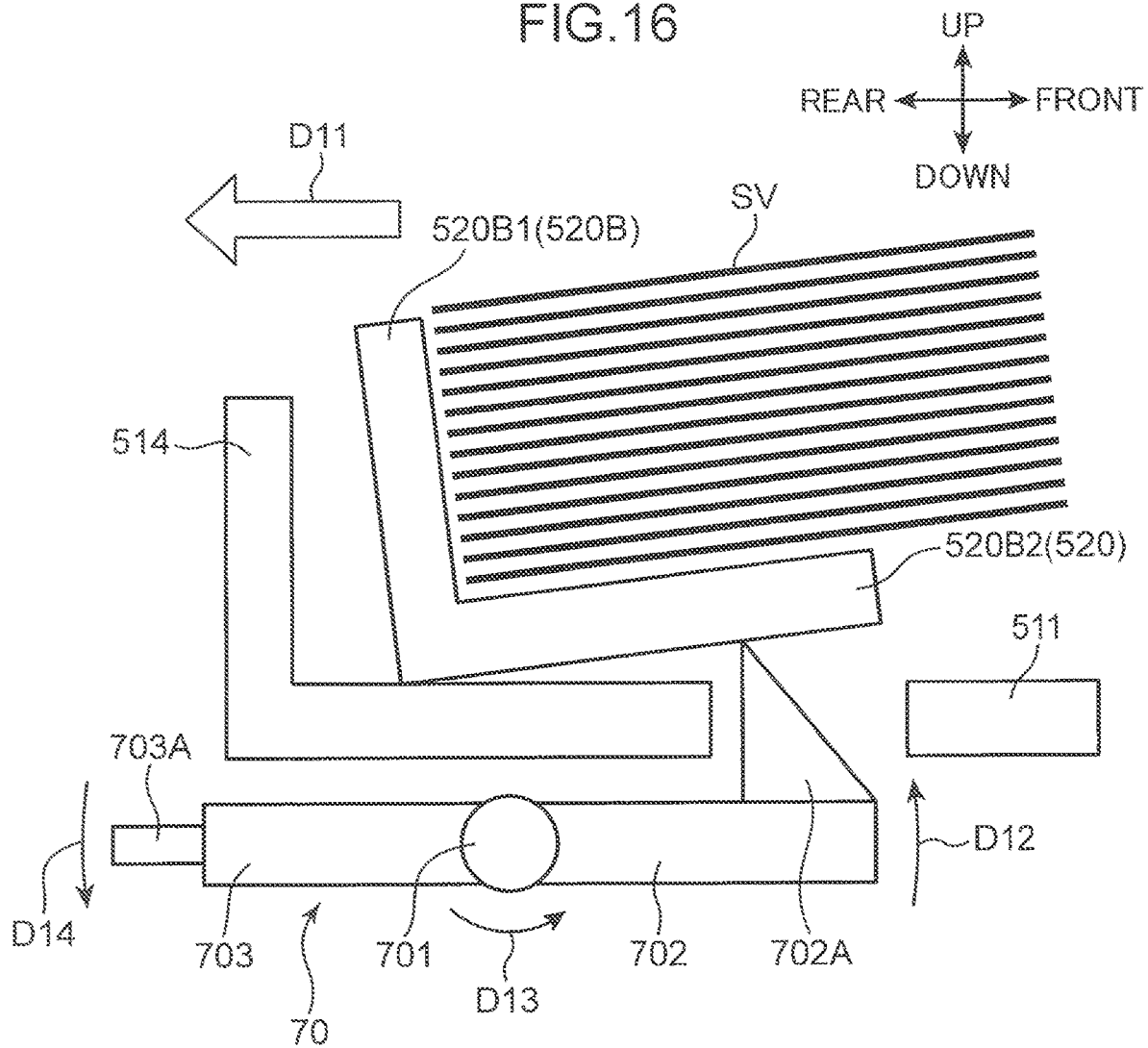
FIG. 16 is a schematic diagram for describing a problem that occurs upon attachment of a sheet cassette to a housing.

FIG. 16 is a schematic diagram for describing a problem that occurs upon attachment of the sheet cassette 500 as described above to the lower housing 21. As described above, when the rear cursor 520B is arranged at the second position together with the front cursor 520A, the horizontal part 520B2 pushes down the pressed part 702A of the link lever 70. As a result, the pressing lever 80 is set to the second posture illustrated in FIG. 7. In this state, for example, a sheet bundle SV composed of a plurality of A4 horizontal size sheets is stacked on the bottom wall 511 (the horizontal part 520B2), as illustrated in FIG. 16. Then, the sheet cassette 500 is pushed in toward the inside of the lower housing 21 by the user (arrow D11 in FIG. 16). Here, when a large load is applied to the vertical part 520B1 due to the inertia force generated by the weight and the acceleration of the sheet bundle SV, the horizontal part 520B2 rises slightly upward as illustrated in FIG. 16. Consequently, the pressed part 702A also moves upward as illustrated by arrow D12, and the link lever 70 swings in the direction of arrow D13 with the first fulcrum part 701 as a fulcrum. Accordingly, the engagement pin 703A of the second arm 703 moves downward as illustrated by arrow D14. Consequently, the engagement hole 802A of the pressing lever 80 is pushed down by the engagement pin 703A, and the pressing lever 80 swings slightly toward the first posture side from the second posture. Consequently, there is a possibility that the switch pressed part 90S of the push switch 90 is not accurately pressed by the pressing lever 80 and an erroneous detection is made that small-sized sheets are stacked on the sheet cassette 500, even though large-sized sheets S (the sheet bundle SV) are stacked on the sheet cassette 500.

Figure 10:
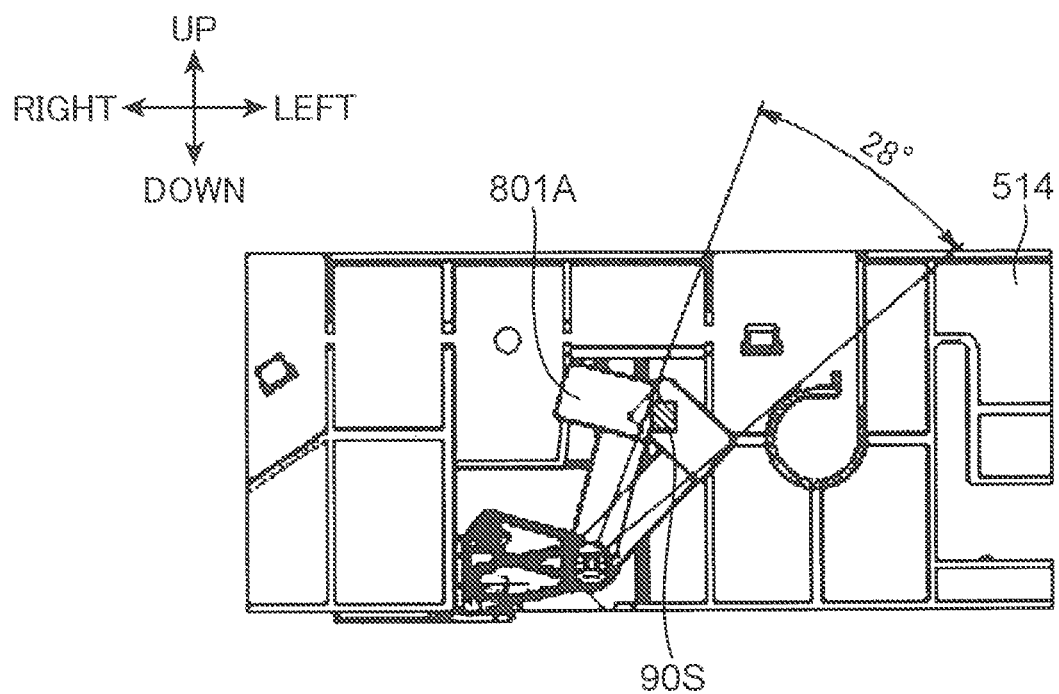
FIG. 10 is a diagram illustrating a rotation angle of the pressing member according to the embodiment of the present disclosure.
Figure 11:
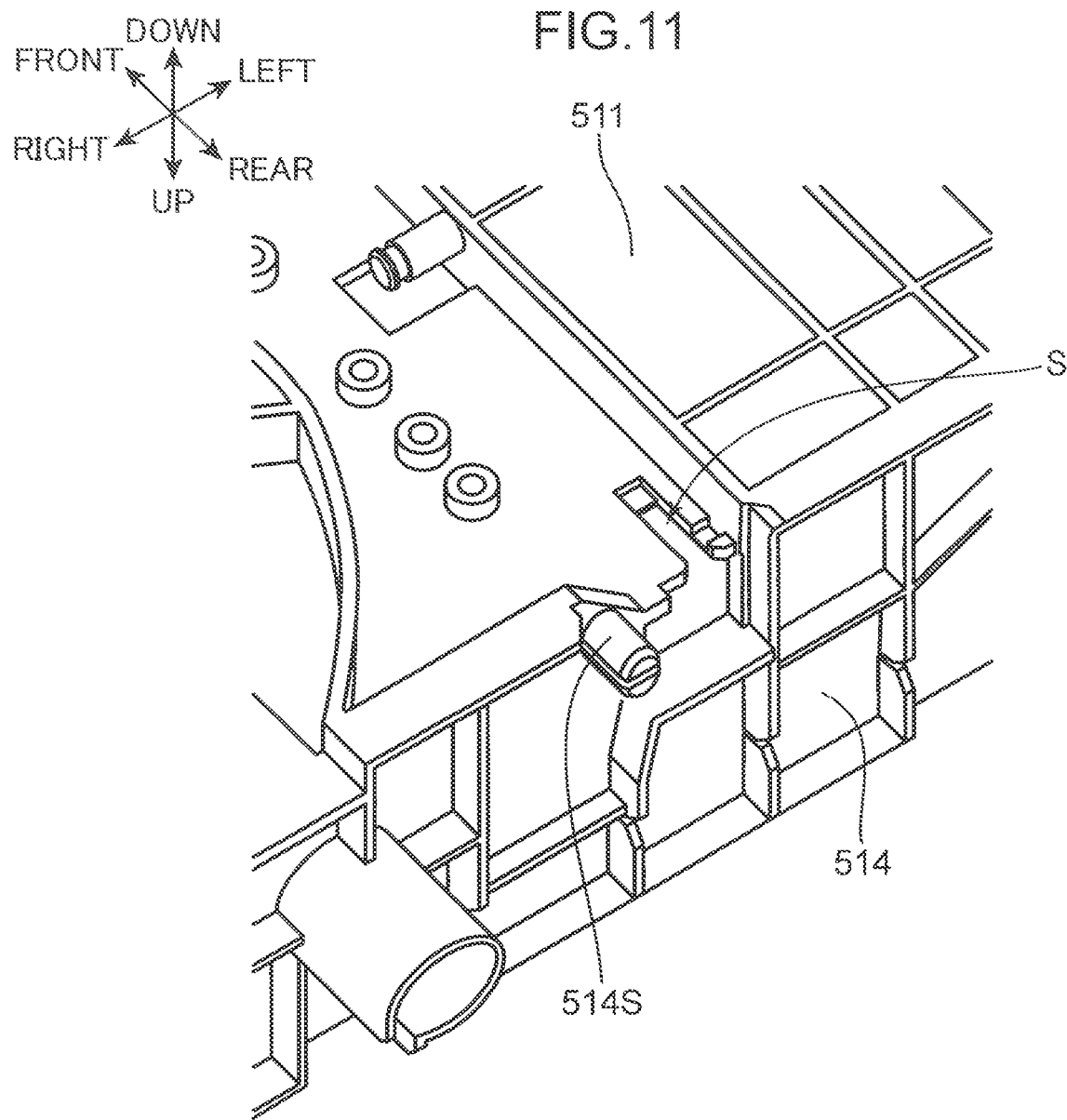
FIG. 11 is an enlarged perspective view of a housing of the sheet cassette according to the embodiment of the present disclosure.

In the present embodiment, the pressing lever 80 has a characteristic shape and structure in order to solve such a problem. FIG. 10 is a diagram illustrating the swinging angle of the pressing lever 80 according to the present embodiment. FIG. 11 is an enlarged perspective view of the housing 510 of the sheet cassette 500. FIG. 12 is a cross-sectional view in which a part of FIG. 5 is enlarged.

Referring to FIG. 6, the switch pressing part 801A of the pressing lever 80 according to the present embodiment has a lateral surface (the rear surface part; a pressing surface) for pressing the switch pressed part 90S of the push switch 90, is provided at the front end of the arm main body 801H, and extends so as to protrude toward the upstream side in the first rotation direction (DR1). In other words, the switch pressing part 801A includes: a base end part 801A2 (a first pressing part); and a front end part 801A1 (a second pressing part). The base end part 801A2 is connected to the arm main body 801H. The front end part 801A1 is connected to the base end part 801A2 and is disposed so as to protrude from the base end part 801A2 further toward the upstream side in the first rotation direction than the arm main body 801H does.

Further, when the sheet cassette 500 is pulled out from the lower housing 21 and the rear cursor 520B is arranged at the second position, the pressing lever 80 is set to the second posture illustrated in FIG. 7 as described above. The swinging angle of the pressing lever 80 about the second fulcrum part 800 is set such that the front end part 801A1 of the switch pressing part 801A presses the switch pressed part 90S in this state (FIG. 7). Even if the horizontal part 520B2 rises slightly upward due to the sheet cassette 500 being forcefully attached to the lower housing 21 and the vertical part 520B1 tilting toward the rear (arrow D121 in FIG. 12) as illustrated in FIG. 16 in this state, the base end part 801A2 of the switch pressing part 801A is capable of pressing the switch pressed part 90S toward the rear, as illustrated in FIG. 9. Accordingly, the occurrence of erroneous detection of the size of the sheets housed in the sheet cassette 500 can be prevented. Note that in the present embodiment, the pressing lever 80 has a rotation angle of about 28 degrees between the first posture and the second posture, as illustrated in FIG. 10.

In the present embodiment, the switch pressing part 801A is capable of stably pressing the switch pressed part 90S of the push switch 90 even when the pressing lever 80 set to the second posture swings slightly toward the first posture side when the sheet cassette 500 in a state in which the rear cursor 520B is set to the second position and a plurality of sheets are housed in the sheet cassette 500 is forcefully inserted into the lower housing 21, as described above.

The erroneous detection of sheet size as described above is not limited to the phenomenon illustrated in FIG. 16, and also occurs when the pressed part 702A temporarily rises due to the positional variation (backlash) of the rear cursor 520B, curving (bending) of the bottom wall 511 and the horizontal part 520B2, and the like. In the present embodiment, however, the third posture of the pressing lever 80 (in which the push switch 90 is switched on) illustrated in FIG. 9 is set between the first posture of the pressing lever 80 (in which the push switch 90 is switched off) illustrated in FIG. 6 and the second posture of the pressing lever 80 (in which the push switch 90 is switched on) illustrated in FIG. 7, as described above. Accordingly, the pressing lever 80 is capable of stably pressing the switch pressed part 90S of the push switch 90 even when the pressing lever 80 set to the second posture is made to swing slightly toward the first posture side.

Further, in the present embodiment, an L-shaped notch S is opened in the lower end part of the rear wall 514 and the rear end part of the bottom wall 511, as illustrated in FIG. 11, and the second arm 703 of the link lever 70 is capable of swinging inside this notch S. Accordingly, a situation is prevented in which the rear wall 514 and the bottom wall 511 of the housing 510 contact the second arm 703 upon attachment of the sheet cassette 500, and the like, and the application of forcible external force to the second arm 703 is prevented. Consequently, erroneous detection of sheet size is prevented to a further extent.

Further, in the present embodiment, the front end part 801A1 of the switch pressing part 801A presses the switch pressed part 90S in the second posture, which corresponds to large-sized sheets. Meanwhile, the base end part 801A2 of the switch pressing part 801A presses the switch pressed part 90S upon attachment of the sheet cassette 500, or in other words, in a case in which the rear cursor 520B is likely to tilt toward the rear. In the latter case, there is a possibility of the pressing lever 80 being bent such that the switch pressing part 801A intersects with the front-rear direction at an acute angle, because complicated stress acts on the inside of the sheet cassette 500. Here, there is a possibility that sufficient pressing force cannot be obtained when the front end part 801A contacts the switch pressed part 90S. Therefore, a configuration is adopted in which the switch pressed part 90S is pressed by the base end part 801A2 connected to the arm main body 801H, whereby it becomes possible to surely and strongly push in the switch pressed part 90S even in a case such as that described above.

Note that the present disclosure is not limited to this embodiment, and modified embodiments such as those below can be adopted, for example.

Figure 13:
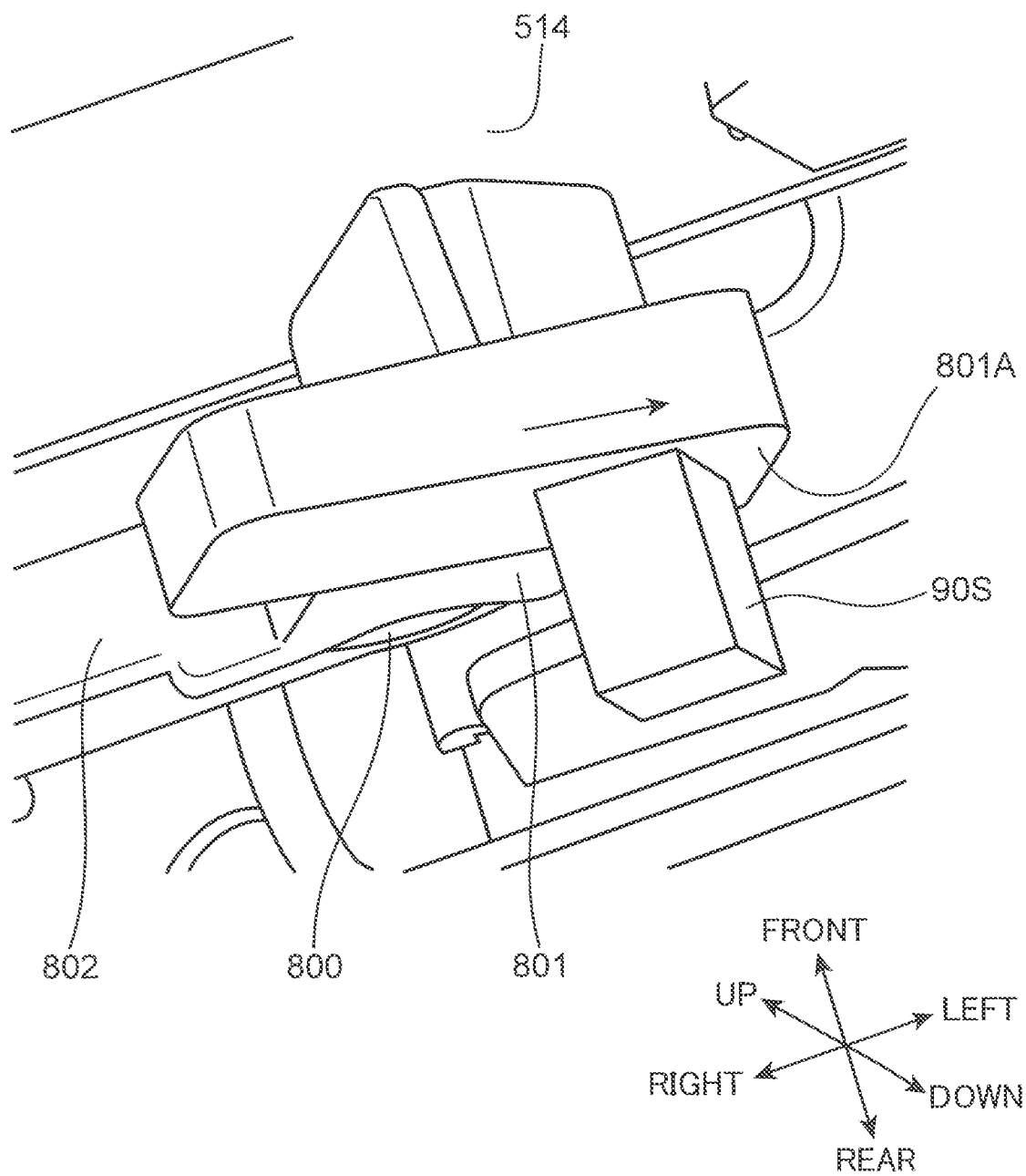
FIG. 13 is a perspective view in which a part of a sheet housing device according to a modified embodiment of the present disclosure is enlarged.
Figure 14:
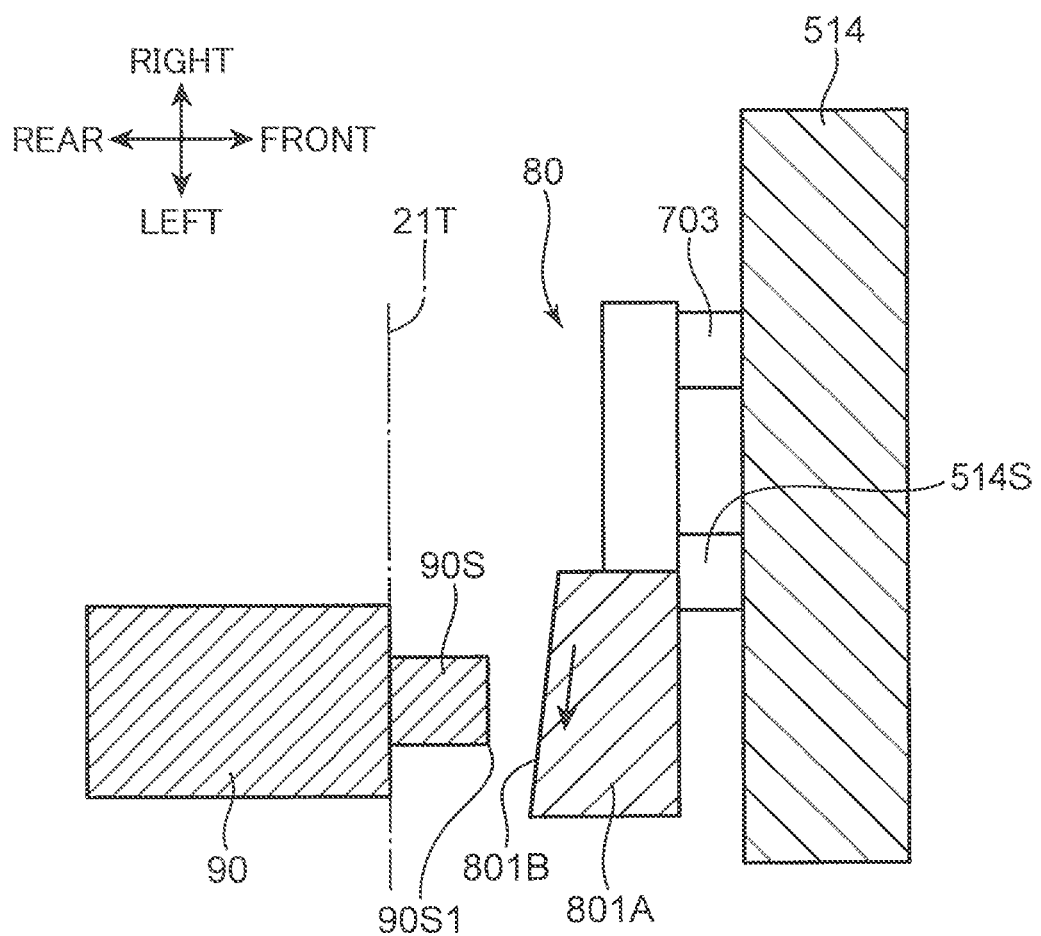
FIG. 14 is a cross-sectional view in which a part of the sheet housing device according to the modified embodiment of the present disclosure is enlarged.

(1) In the above-described embodiment, description is provided based on an aspect in which the switch pressing part 801A includes a rear surface part formed from a flat surface that is parallel to the left-right direction, and the rear surface part is configured to be capable of pressing the switch pressed part 90S of the later-described push switch 90. However, the present disclosure is not limited to this. FIG. 13 is a perspective view in which a part of a sheet housing device according to a modified embodiment of the present disclosure is enlarged. FIG. 14 is a cross-sectional view along the horizontal direction, in which a part of the sheet housing device according to the present modified embodiment is enlarged.

The pressing lever 80 illustrated in FIG. 14 includes an inclined surface 801B (a pressing surface) that is inclined so as to approach the switch pressed part 90S from the front end part 801A1 (the second pressing part) toward the base end part 801A2 (the first pressing part) and that contacts the switch pressed part 90S. According to such a configuration, the inclined surface 801B contacts a corner part 90S1 of the switch pressed part 90S, and thus the pressing lever 80 can be drawn in in a reverting direction (direction of arrows in FIGS. 13 and 14) and the pressing lever 80 is prevented from changing the posture thereof to the third posture illustrated in FIG. 9. That is, the swing of the pressing lever 80 toward the upstream side in the first rotation direction is suppressed by the contact between the inclined surface 801B and the switch pressed part 90S. Hence, the switch pressed part 90S can function so as to prevent the pressing lever 80 from swinging.

(2) Further, FIG. 15 is a perspective view in which a part of a sheet housing device according to another modified embodiment of the present disclosure is enlarged. The pressing lever 80 illustrated in FIG. 15 includes: the pressing surface (the rear surface part of the switch pressing part 801A); and an engagement part 80T that is arranged at a downstream side edge part of the pressing surface in the first rotation direction and that is capable of engaging with the detection switch 90 in the second posture (FIG. 7). In particular, in the present modified embodiment, the engagement part 80T is an arch-shaped rib that is protruded from the rear surface part of the switch pressing part 801A toward the detection switch 90 at the downstream side in the first rotation direction than the switch pressed part 90S. When the sheet cassette 500 is attached to the lower housing 21, the engagement part 80T is arranged so as to overlap with the front end part of the switch pressed part 90S in the left-right direction. According to such a configuration, the engagement part 80T and the switch pressed part 90S engage with one another, and thus, the switch pressed part 90S can function so as to prevent the swing of the pressing lever 80. In particular, the swing of the pressing lever 80 can be prevented by using a simple rib structure provided to the switch pressing part 801A.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A sheet housing device comprising:
a housing that has an opposing wall; and
a sheet cassette that is capable of housing sheets and that is attached to the housing along a first direction;
wherein
the sheet cassette includes:
a bottom wall on which the sheets are stacked;
a wall part that is erected from the bottom wall and faces the opposing wall in a state in which the sheet cassette is attached to the housing;
a pair of cursors that is slidable along the first direction on the bottom wall and restrict a position of the sheets, the pair of cursors including a first cursor that is arranged to face the wall part in the first direction and a second cursor that is arranged to face the first cursor at an opposite side from the wall part, the first cursor and the second cursor relatively moving in conjunction with each other in the opposite directions along the first direction; and
a detection mechanism that detects a position of the first cursor,
the detection mechanism includes:
a detection switch arranged at the opposing wall;
a first actuator that is supported by the bottom wall so as to be swingable with a first fulcrum part extending along a second direction perpendicular to the first direction as a fulcrum; and
a second actuator that is supported by the wall part so as to be swingable with a second fulcrum part extending along the first direction as a fulcrum,
the first actuator has: a pressed part that is provided at one end side of the first actuator in the first direction and is capable of emerging from and being retracted into the bottom wall; and a connection part that is provided at other end side of the first actuator in the first direction,
the second actuator has: a support arm that extends in one direction from the second fulcrum part of the second actuator; a connected part that is arranged at an end part of the support arm and is connected to the connection part; a pressing arm that extends from the second fulcrum part of the second actuator in a direction differing from the direction in which the support arm extends; and a switch pressing part that is arranged at an end part of the pressing arm and is capable of pressing the detection switch,
the detection switch has a switch pressed part that is arranged at the opposing wall so as to face the second actuator and is capable of being pressed by the switch pressing part,
the first cursor is configured to be movable between a first position at which the first cursor is arranged at a predetermined distance from the second cursor in the first direction and a second position at which the first cursor is more distant from the second cursor toward the front end side in the first direction compared to a case where the first cursor is in the first position,
when the first cursor is set to the first position, the pressed part of the first actuator protrudes upward from the bottom wall and the connection part pushes down the connected part of the second actuator, and the second actuator is set to a first posture in which the switch pressing part is spaced away from the switch pressed part,
when the first cursor is set to the second position, the first cursor pushes down the pressed part of the first actuator and the connection part pushes up the connected part of the second actuator, and the second actuator swings in a first rotation direction from the first posture with the second fulcrum part as the fulcrum and the second actuator is set to a second posture in which the switch pressing part is capable of pressing the switch pressed part, and the switch pressing part has: a first pressing part that is connected to a front end of the pressing arm; and a second pressing part that protrudes from the first pressing part further toward an upstream side in the first rotation direction than the pressing arm does.

2. The sheet housing device according to claim 1, wherein when the second actuator is set to the second posture, the second pressing part of the switch pressing part presses the switch pressed part.

3. The sheet housing device according to claim 1, wherein the switch pressing part of the second actuator has a pressing surface that faces the switch pressed part, and the pressing surface is an inclined surface that is inclined so as to approach the switch pressed part from the second pressing part toward the first pressing part and that is capable of contacting the switch pressed part, and a swing of the second actuator in the upstream side in the first rotation direction is suppressed by a contact between the inclined surface and the switch pressed part.

4. The sheet housing device according to claim 1, wherein the switch pressing part of the second actuator has: a pressing surface that faces the switch pressed part; and an engagement part that is arranged at a downstream side edge part of the pressing surface in the first rotation direction and that is capable of engaging with the switch pressed part in the second posture.

5. The sheet housing device according to claim 4, wherein the engagement part is a rib that is protruded from the pressing surface toward the detection switch.

6. An image forming device comprising:
the sheet housing device according to claim 1; and
an image forming unit that forms images on the sheets.

* * * * *